Figure 6:
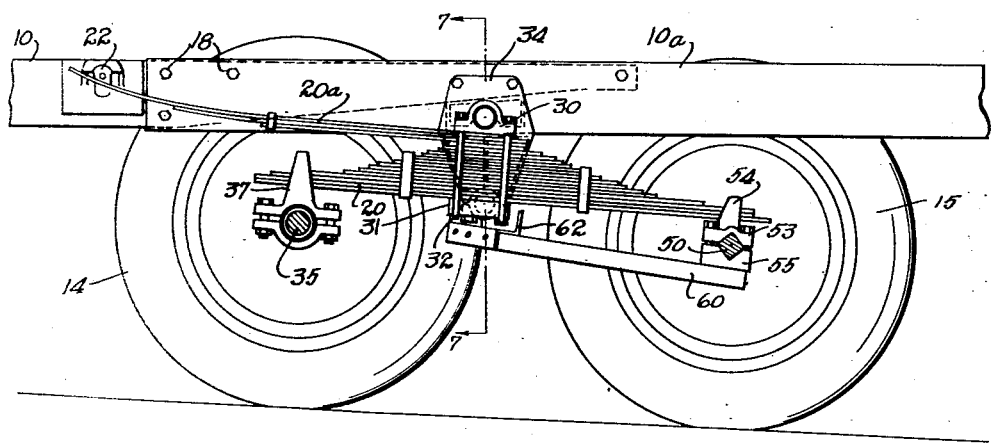

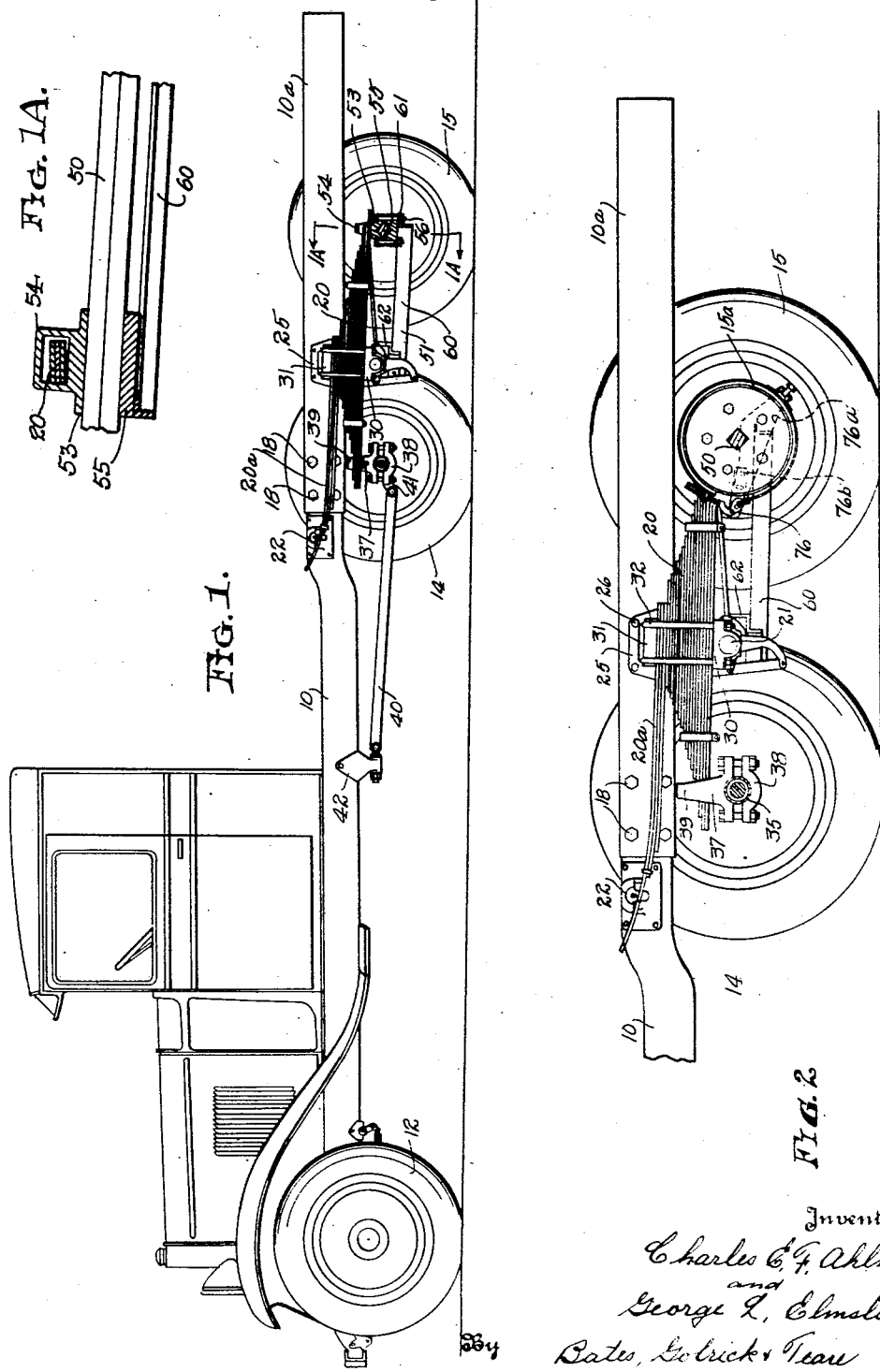

Dec. 20, 1932.   C. E. F. AHLM ET AL   1,891,399
MOTOR VEHICLE MECHANISM
Filed April 11, 1930   3 Sheets-Sheet 2
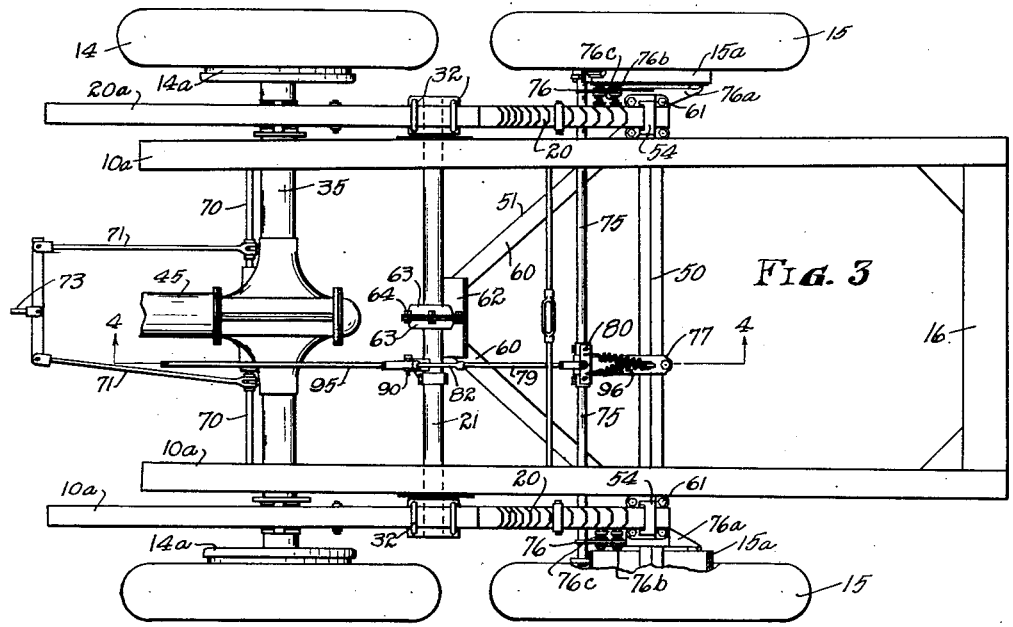
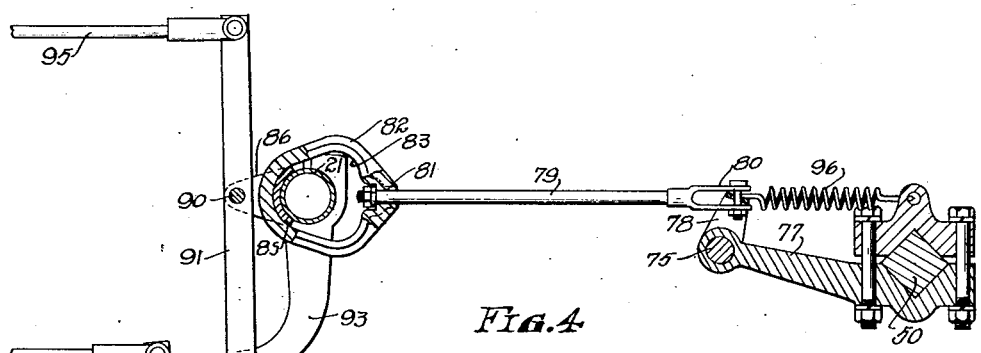
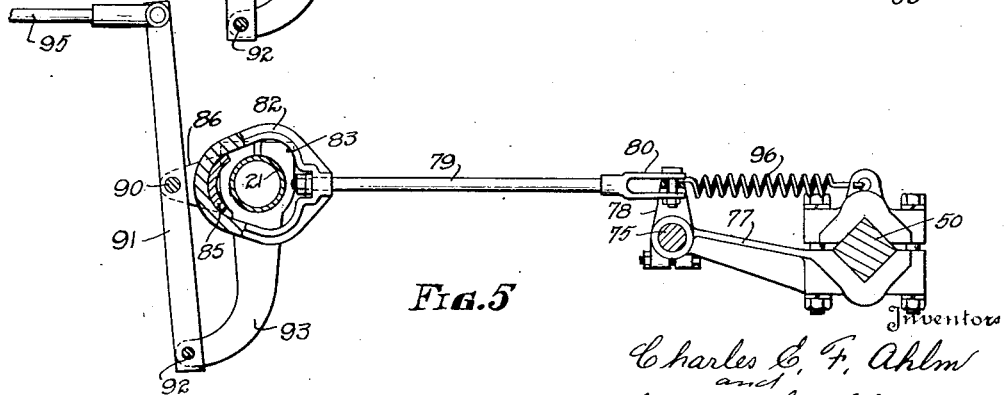

Dec. 20, 1932.  C. E. F. AHLM ET AL  1,891,399
MOTOR VEHICLE MECHANISM
Filed April 11, 1930   3 Sheets-Sheet 3

Inventors
Charles E. F. Ahlm
and
George L. Elmslie
By Bates, Golrick & Teare
Attorneys Patented Dec. 20, 1932

1,891,399

UNITED STATES PATENT OFFICE

CHARLES E. F. AHLM, OF CLEVELAND HEIGHTS, AND GEORGE L. ELMSLIE, OF CLEVELAND, OHIO, ASSIGNORS TO CONTINUOUS TORQUE TRANSMISSION COMPANY, OF CLEVELAND, OHIO, A CORPORATION OF OHIO

MOTOR VEHICLE MECHANISM

Application filed April 11, 1930. Serial No. 443,421.

This invention relates to a multiple wheel rear supporting structure for a motor-driven vehicle wherein the load carrying capacity of the vehicle is increased over that of the usual two wheel rear supporting structure. This invention also relates to a multiple wheel rear supporting structure for vehicles wherein it is desirable to apply a braking power to all of the rear wheels.

Rear supporting structures, for motor driven vehicles, comprising four wheels mounted on a pair of tandem axles, have been used to some extent in the past. However, considerable difficulty has been encountered in such constructions when brakes have been associated with each of the four wheels. This has been due to the fact that in the past the axles have, in many instances, been secured to the springs in such a manner that each of the tandem axles followed the path of movement of the ends of the supporting springs. The movement of the axles in following the spring ends has been practically unrestricted to prevent damage to the springs. Hence, when suitable brakes were applied to each of the wheels it was found that there was no definite locus relative to the frame about which the axles moved. Therefore, the brake control members have been affected by the movements of the axles. When the axles floated away from the brake control member, the action was such that the brakes were applied at a time when they normally were released. Therefore, because the axles were free to float in all directions, or had a bodily universal movement, relative to the frame and/or because they followed the ends of their respective spring connecting members, it is readily seen, that when the vehicle moved over uneven ground or traction surfaces the flexing movements of the springs would cause the axles to move about an indefinite locus relative to the frame thereby causing application of the brakes at times when they should be idle.

In the past the tandem axles have been secured to the ends of suitable springs which were pivoted intermediate their ends to the frame. The purpose of this type of mounting was to permit relative free movement of the axles, and at the same time retain the load on all four wheels. It is readily seen that, when the springs are pivoted, the mere swinging of the springs and axles about the pivot is apt to cause the application of the brakes. This results in damage to the vehicle and places unwarranted strains upon the supporting structure, as well as increases the wear upon the tires.

The general object of this invention is the provision of an additional axle and wheels therefor, which shall resiliently support the truck frame in such a manner that the axle is free to move in a defined path relative to the frame and is unhampered in such defined movements by the spring arrangements.

A further object of this invention is the provision of an extra load carrying mechanism in connection with a motor vehicle wherein a pair of load supporting wheels in addition to the usual load carrying traction wheels is provided in such a manner as to permit unhampered braking action on all of the wheels.

Another object is to provide a spring suspension for traction and non-traction wheels wherein brakes may be associated with each of the four wheels and wherein the wheels and axles are capable of movement relative to the frame and to the spring suspension without interfering with the brake operating mechanism.

Other objects and features of the invention will become more apparent from the following description relating to the accompanying drawings which show preferred forms thereof. The essential characteristics are summarized in the claims.

Figure 7:
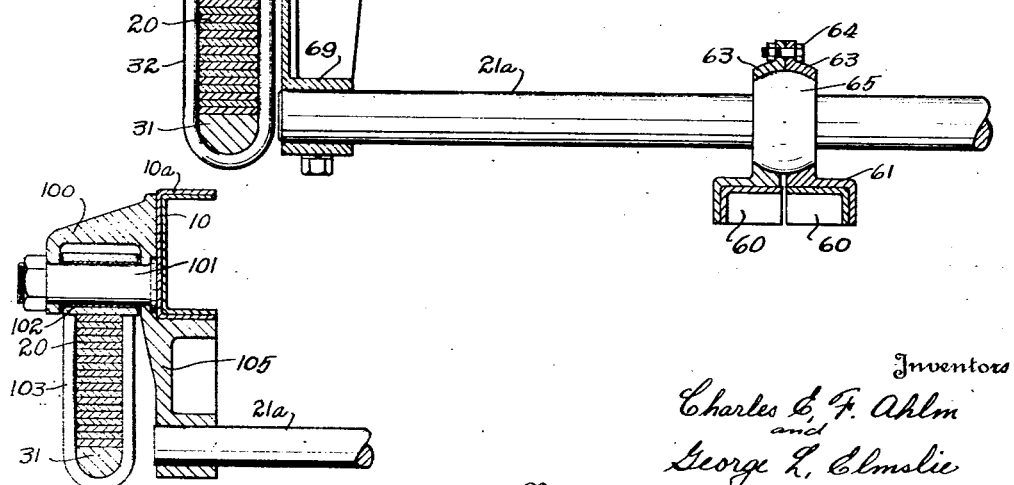
Figure 8:
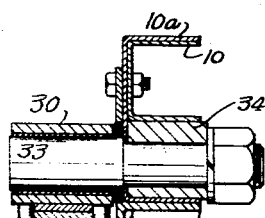

In the drawings, Fig. 1 is a side elevation of a motor vehicle provided with one form of our invention; Fig. 2 in a side elevation, on an enlarged scale, of the four wheel rear supporting structure shown in Fig. 1; Fig. 1A is a detail sectional view showing one of the axles in tilted position, the section being taken substantially along the lines 1A—1A on Fig. 1; Fig. 3 is a fragmentary plan of the mechanism shown in Figs. 1 and 2; Fig. 4 is a vertical section illustrating the manner of mounting the brake control mechanism for the dead or non-driven axle and is indicated by the lines 4—4 on Fig. 3; Fig. 5 is a sectional view similar to Fig. 4 but illustrating some of the parts in a different position; Fig. 6 is a fragmentary side elevation of the rear portion of a truck chassis equipped with a modified form of the invention, and Fig. 7 is a transverse vertical section, illustrating the modified form, and is indicated by the line 7—7 in Fig. 6; Fig. 8 is a transverse vertical section through another modified form.

In general the invention comprises a pivotal support on the chassis for a pair of multiple leaf springs, the springs supporting the chassis in such a manner that all of the load is imparted to the axles through the springs. A non-driven or a dead axle is disposed preferably to the rear of a live or driven axle. The springs are so associated with the axles as to permit relative longitudinal movement between the axles and the springs. Suitable means, as spacing members, are secured to the axles and to the frame to cause the axles to follow a movement, defined relative to the frame, and independent of the path of the movement of the springs. To this end, each spring has a floating connection, both with the driven axle and the non-driven axle. The pivot axis of the springs may be disposed materially closer to the vertical plane of the live axle then the corresponding plane of the dead axle in order to increase traction on the driven axles. The spacing members which connect the live axle to the frame are substantially the same as those found in the usual four wheel vehicle. The dead axle of the rear supporting structure is retained in position relative to the frame by a draw bar which joins the frame to the axle.

It is to be understood that while the intermediate axle is shown as being the driven axle, the arrangement may be reversed and the rearmost axle becomes the driven axle, or as a matter of choice both axles may be driven. It will also become apparent from the following description that the spring suspension may be materially changed and the operation of the braking connections be undisturbed. The braking connections of the dead axle are made in such a manner that they will, under normal conditions, move substantially as a unit with the draw bar which interconnects the axle with the frame and will therefore remain undisturbed by relative movement between the axle and the frame.

While we have chosen to illustrate our invention as attached to the usual four wheel truck, such as is illustrated in Fig. 1, it is contemplated that it may be attached to a vehicle having more than four wheels and the supporting structure itself may include more than four wheels.

Referring in detail to the drawings, 10 designates the usual side frame members of the ordinary truck chassis, there being two such members, one at each side of the truck. In the embodiment illustrated, these frame members are channel shaped. The usual dirigible wheels are located at the forward end of the truck and are indicated at 12, the driven or traction wheels are located at the rear portion of the frame members 10 and are indicated at 14, and the additional or supplementary load supporting wheels are indicated at 15. Any suitable platform or truck body, not shown, may be carried by the frame or an extension thereof designated 10a.

In the embodiment illustrated, a frame extension 10a provides a support for the spring suspension, which is associated with the wheels 14 and 15. This frame extension may comprise a pair of channel shaped members having the usual web and flanges, and tied together by suitable cross frame members or braces, one of which is indicated at 16 by way of example. The extensions 10a are secured to the main frame channels 10 by suitable bolts, shown in Figs. 1, 2 and 6 at 18. In the construction illustrated the forward portions of the frame extension channels 10a embrace the rear ends of the main frame members 10 as is illustrated in Fig. 6. However, it is contemplated that the frame extension and main frame be one unit.

The spring suspension, which transfers the load of the body and chassis to the rear axle, includes a pair of leaf springs, one of which is located at each side of the frame extensions 10a. The springs are designated 20 and may comprise laminated leaves of the usual type, the leaves preferably decreasing in length towards the top, as shown. The pivotal connection between the springs and the chassis frame or frame extension, as shown in Figs. 1 to 3, include a comparatively rigid cross frame bar 21, the ends of the bar extending beyond the frame members and underlying their respective springs. The bar is supported by suitable brackets 25 which depend from the frame extension channels, each of the brackets preferably having a web portion which lies adjacent the web of the frame and a bottom or flange portion which lies adjacent the bottom flange of the frame. The brackets may be secured to the frame in any suitable manner, such as by bolts 26, and the bar 25 may be rigidly secured in the brackets by means of clamping plates or by any suitable means.

Suitable connections are provided between the springs 20 and the transverse bar 21, which permit the springs to pivot, thereby causing the load to be carried by all four wheels when the vehicle is on uneven ground or traction surfaces. Such connections may comprise spring seat members 30 which support the leaves of the springs, and which may be disposed either below the springs, as shown in Figs. 1 and 2, or above, as shown in Fig. 6. The members 30 are pivoted to the cross frame member 21 in such a manner as to permit the springs to rock about their pivots. If desired, the members 30 may be secured against transverse movement on the cross member 21 by suitable nuts or other retaining means. The springs 20 are secured to the members 30 in the usual manner, there being semi-cylindrical clamping plates 31 on the side of the springs, opposite the member 30, which are grooved to retain suitable U-bolts 32. The U-bolts project through ears in a clamping member 30 and are secured thereto by the usual nuts.

The springs, as shown in Fig. 2, pivot about the transverse frame member; however, this is not essential. As illustrated in Figs. 6 and 7, the springs pivot about pins 33 which are mounted in brackets 34 secured to the webs of the extension members 10a and are entirely independent of any cross frame member. I have found this latter construction highly desirable because it permits the spring to underlie the pin, thereby transmitting the load directly from the pivots to the springs, thus relieving the U-bolts from the tensional strains of transmitting the load to the spring.

The live or driving axle which propels the vehicle is of the type usually found in four wheel trucks and may comprise the usual spindles and housing, the latter being designated at 35 in all figures. The housing 35 has a floating connection with the forward ends of the springs 20. In Figs. 1, 2 and 3, I show the floating or sliding connection, between the spring and the housing, as comprising seat members 37 clamped to the axle housing by suitable clamping members 38. As illustrated, each seat member 37 has an upwardly extending loop 39 which forms a longitudinally extending aperture. One end of each spring 20 is mounted in its respective loop and sufficient clearance is provided to permit free longitudinal movement between the springs and the axles under all conditions. The preferred specific arrangement of spring perches with relation to the axle is substantially in accordance with the perch arrangement between the springs and the supplementary axle (see Fig. 1A), and this specific arrangement will be hereinafter described in connection with the supplementary axle mechanism.

The housing 35 is provided with suitable radius rods or draw bars 40, (Fig. 1) which guide the housing and its associated axles for movement in a definite path relative to the frame. For this purpose, we prefer to employ the construction found in the usual four wheel truck chassis and illustrated diagrammatically in the drawings. As shown in Fig. 1, each clamping member 38 has a forwardly extending ear 41 to which one end of a draw bar 40 is pivotally connected. The other end of the draw bar is universally pivoted to a bracket 42 on both longitudinal and transverse axes, the bracket being secured to the corresponding frame member 10 some distance forwardly of the transverse vertical plane of the housing 35.

A suitable torque member is provided to prevent rotation of the housing 35. For this purpose, we prefer to employ the structure generally found in a four wheel truck chassis and which is diagrammatically shown in Fig. 3 of the drawings. As shown, the torque member comprises a hollow tubular member 45, rigidly secured to the housing 35, extending forwardly therefrom and housing the propeller shaft. The forward end of the torque member is joined, by a suitable flexible connection, to the transmission housing or some similar structure.

The dead or supplementary axle, which relieves the driving axle of a portion of the load, is indicated at 50 in all figures. This supplemental axle preferably comprises a bar of suitable material, such as forged steel, rectangular in shape, and provided at its ends with suitable antifriction bearings, not shown, for supporting the wheels 15. A preferred connection between the dead axle and each spring 20 comprises a seat member 53, which has an upwardly extending loop 54, similar to the loop 39 of the block 37 which is associated with the live axle. The loops 54 engage the ends of their respective springs 20 in such a manner as to permit free relative longitudinal sliding movement between the axle and the springs. This construction is similar to that used in connection with the forward or driven axle.

Referring to Fig. 1A, it will be seen that by reason of the vertical clearance as well as transverse clearance shown in both this and Fig. 3, the ends of the springs 20 may rock on the surfaces of the perches as well as shift longitudinally. Whenever the axle tilts, one side of each spring (as shown) may be thus lifted off the perch surface, the degree of lift depending on the load on the frame. The vertically extending portions of the loops 54 prevent axial movement of the dead axle the same as in the case of the live axle, and the uppermost portions of the loops strengthen the sides and, incidentaly, prevent the springs from jumping off the perches. It will be understood, of course, that in the case of a very heavy load, the spring may twist somewhat, in which case the lower surfaces of the springs may remain in full engagement with the adjacent respective perch surfaces. Nevertheless, the springs, by reason of the free floating connection, never transmit such force to any portion of the vehicle as will tend to lift the driving wheel on the same side as the wheel of the dead axle which is raised when the axle is tilted, so as to break contact between this driving wheel and the ground. This is, of course, because as the load is increased the tendency for either driving wheel to be raised from the ground, in driving over very uneven surfaces, is decreased. A suitable clamping block 55 is provided to secure the seat 53 to the axle. Suitable bolts 56, extending through ears in the clamping block 55, secure the latter tightly in place against movement on the dead axle.

It will be understood that, as shown in Fig. 1, the spring seats 37 and 53, and their associated clamps 38 and 55 are, at all times, practically rigid with the axle housing and the dead axle respectively. The ends of the springs, as shown, project through the loops 39 and 54, an amount sufficient to permit a maximum deflection of the springs and at the same time prevent their disengagement from the loops 39 and 54. Sufficient side clearance is provided between the sides of the loops and the springs to prevent any binding action which would hamper the free longitudinal movement of the springs relative to the axles.

The dead axle 50 is provided with a radius rod or draw bar member 51 which guides the axle for movement in a definite path relative to the frame. The draw bar 51 also spaces the dead axle 50 relative to the frame and secures the axle to the frame. In the embodiment illustrated, the draw bar comprises a pair of structural members or bars 60, one end of each being rigidly secured, as at 61, to the clamping block 55 heretofore described. The other end of each of the bars 60 is secured to a bracket or gusset plate 62 located in such a manner as to form a substantially rigid wishbone. The bracket 62 is preferably made in two sections, each of which carries a socket portion 63 and which are joined together, in a substantially rigid unit, by suitable bolts 64. The construction is such that the socket members 63 lie substantially in the lateral center of the chassis, the socket portions embracing a ball shaped member 65 which is secured to a suitable frame member of the truck. The ball-shape member 65 is not illustrated in Figs. 1, 2 and 3, but is provided in accordance with the detailed showing of Fig. 7.

In the forms illustrated in Figs. 1 to 5, the draw bar or wishbone 60 has been secured to the cross frame member 21, the ball 65 being secured to the central portion of the bar. This location is in no way essential because the floating or sliding movement between the springs and the dead axle permits the axle to move about a transverse axis which may be in any desired position on the truck but which is preferably located forward of the dead axle so that the wishbone 60 will normally be in tension rather than compression.

In Figs. 6 and 7, the wishbone is shown as being universally connected to a cross frame bar 21a which is below the pivot axes of the springs 20. The bar 21a in this instance is clamped in brackets 69 which are secured to and depend from the frame members 10 or 10a. This construction transmits the strains from the spring pivots, and the strains from the wishbone to the frame entirely independently of each other.

It will be seen from the above construction that both the front or driving axle and the rear or dead axle move in paths which are fixed relative to the frame and they are controlled for longitudinal movement relative to the frame by their respective radius or draw bars. It is likewise apparent that the axles are not affected by the changes in length of the springs due to their flexing movements. The springs act only to restrict or limit, to some extent, the transverse movement of the axles. In order to increase the traction of the driving wheels suitable traction springs 20a may be secured to the main springs 20, or their supports, as shown in Figs. 1, 2 and 6. These, as shown, extend forwardly beneath laterally extending abutment members 22 mounted on chassis in any suitable manner.

Both the dead axle and the driven axle are provided with suitable braking apparatus to distribute the braking strains to both axles. As shown, each of the wheels 14 and 15 are provided with brake drums 14a and 15a respectively. The operating mechanism for applying the brakes 14a is similar to the usual linkage ordinarily found in a four wheel truck chassis and is shown diagrammatically in Figs. 1 and 3. This operating mechanism includes the usual brake operating rods 70, joined by links 71 to opposite ends of an equalizing bar 72 which is connected by a rod 73 with a foot pedal or hand lever (not shown) located within the cab and under control of the operator of the vehicle. The construction is the same as is now in general use and is such that proper braking action is accomplished irrespective of the movement of the live axle, the movements of which remain substantially unaltered in our construction.

The brakes 15a, as illustrated in the drawings, are connected by transversely extending shafts or rods 75, the rotation of which is adapted to cause the application of the brakes in the usual manner. As illustrated in Figs. 2, 3 and 4, the rods 75 are supported near their outer ends on arms 76 which are secured to brackets 76a rigid with the axle 50, and at their inner ends by a bracket 77 rigidly secured to the axle. The arms 76 have floating supports on the brackets 76a which provide for equalizing the brakes. There are spaced bolts 76b for each arm, one of which extends through a transverse slot in the arm 76, both bolts having springs 76c to yieldingly hold the arm in its natural position.

Levers 78 are respectively secured to the rods 75, substantially at the center of the chassis, and are joined by an equalizing bar 78a, to which an operating link 79 is loosely pivoted. The link 79 is connected by means of a suitable swivel connection 81 to a ring or yoke 82 which encircles the frame member 21 to which the wishbone or draw bar, for the rear axle is joined. In the construction shown, the opening 83 of the ring 82 is larger than the cross sectional area of the frame member 21, thereby permitting relative movement between the yoke and the frame member 21. Interposed between the frame member 21 and the ring is an arcuate shoe 85, one face of which conforms to the surface of the frame member 21 and the other face to the inner surface of the yoke or ring 82. The shoe 85 has forwardly extending ears 86 which are pivoted at 90 to a lever 91 which in turn is pivoted at 92 to a supporting bracket 93 rigidly secured to the frame member 21. The upper end of the lever 91 is connected, by means of a suitable brake control rod 95, to a brake pedal or lever located in the cab of the vehicle.

The action of the brake operating mechanism is such that when the brake pedal is positively operated, the control rod 95 is drawn forward, thereby causing the shoe 85 to draw the yoke and rod 79 forward and resulting in the rotation of the tie rods 75 and the application of the brakes 15a. Suitable springs 96 are interposed between the dead axle and the arm 78 and act to maintain the parts in a normal or inactive position, in which position the brakes 15a are idle. The construction described is such that when the rear or dead axle moves about the pivot of the draw bar or wishbone 51, the rods 75 and 79 and the yoke or ring 82 also shift or rock about the same axis, namely the frame member 21 or 21a, the yoke 82 rotating around the frame member in sliding cooperation with the yoke 85 and without disturbing the latter.

When the brake, however, is applied the bar 95 causes the shoe 85 to draw the yoke 82 away from the pivot or cross member 21, thereby rotating the tie rods 75 and applying the brakes 15a to the wheels 15.

Fig. 8 illustrates a modified form of pivotal support for the springs 20 wherein the bracket which supports the spring pivot also supports a transverse frame member about which the drawbar 51 is pivoted. In this construction brackets 100 are rigidly secured to the outer face of the frame members 10a. Each bracket has an outwardly extending inverted U shaped portion which carries a pivot pin 101. A suitable saddle 102 lies between the legs of the U and embraces the pin. U bolts 103 pass through suitable ears (not shown) on the saddle and secure the springs thereto, the construction being similar to that shown in Figure 6. Each bracket has a downwardly extending portion 105, which underlies the bottom flange of the channel and to which the cross frame member 21a is secured by suitable clamping means not shown.

We claim:

1. A road vehicle, including a load supporting frame, a main, driving axle and a supplemental axle, said axles being located near the rear end of the frame, wheels associated with the axles, rigid members comprising positioning means for said axles extending forwardly from respective axles to determine the paths of movement thereof, each of said members being secured to the frame and each being secured to a different one of the axles, said members effecting independent universal connections between the axles and the frame, and spring members interposed between the axles and the frame to transfer the load from the frame to the axles, and guiding means connecting said spring members to respective axles for free floating relative movement between the axles and the springs in directions lengthwise of the vehicle and vertically, whereby the axles are free to move bodily substantially vertically and to tilt transversely of the vehicle, without imposing thrust on the springs lengthwise of the vehicle, or twisting strains thereon.

2. A road vehicle, including a load supporting frame, main driving axle and a supplemental axle located near the rear end of the frame, wheels associated with the axles, rigid positioning members each pivotally attached to the frame forwardly from the respective axles and respectively secured to the axles to connect the axles and the frame and to limit the movement of the axles with reference to the frame, and longitudinally arranged spring members interposed between the axles and the frame, each member bridging two axles at respective sides of the vehicle to transfer the load from the frame to the axles, and guiding means operatively connecting the ends of the spring members to respective axles for free movement longitudinally of the spring members relative thereto, said guiding means comprising perches secured to the axles and on which the ends of the springs rest, said guiding means having surfaces for limiting axial movement of the axles while permitting bodily movement of the axles substantially vertically and tilting movement thereof relative to the said ends of the spring members in vertical planes transversely of the vehicle.

3. In a road vehicle, a frame, two rearwardly disposed load supporting axles, a spring suspension for the axles common to the two and comprising longitudinally arranged spring members pivoted intermediately of the axles, and with end portions arranged to transfer the load from the frame to the axles, one of the axles having spring perches with vertically extending guides adjacent the springs, limiting axial movement of said axle while permitting free tilting movement thereof without twisting the springs, and rigid positioning means for the said axle having the perches, said positioning means being universally pivoted to the frame on an axis substantially in the vertical plane of the spring pivot axis whereby to reduce the relative movement of end portions of said spring members and the axle positioned by said rigid means, longitudinally of the vehicle.

4. A rear supporting structure for a vehicle, comprising a pair of axles one a main driving axles of the usual type and the other a supplemental axle, wheels associated with the axles, rigid positioning means associated with the supplemental axle and universally pivotally connected with the frame intermediately of the axles for connecting the supplemental axle to the frame, said means being adapted to restrain the movement of the axle to a definite path of movement relative to the frame, longitudinally extending springs pivoted to the frame, the ends of the springs being supported by the axles, and spring rest perches interposed between the springs and the said supplemental axle adapted to permit free longitudinal movement and free tilting movement of the springs relative thereto.

5. A motor vehicle, including a load supporting frame, a plurality of axles located at one end of the frame, wheels associated with the axles, individual means connecting the axles to the frame arranged to fixedly determine the paths of movement of the axles relative to the frame, said means including a rigid radius member for one of the axles, said member being universally connected to the frame intermediately of the axles substantially centrally of the frame and rigidly secured to the respective axle, longitudinally extending springs interposed between the axles and the frame, and means for connecting the axle, which is connected to the radius member, to the springs for longitudinal floating and free tilting relative movement between the springs and said axle.

6. A road vehicle, including a load supporting frame, a plurality of axles located near one end of the frame including a main driving axle of the usual type and a supplemental axle, wheels associated with the axles, rigid axle positioning means respective to said axles and extending forwardly from said respective axles to the frame to individually determine the paths of movement of the axles for bodily raising and lowering movement in definite paths and transverse tilting movement, longitudinally arranged spring members interposed between the axles and the frame to transfer the load from the frame to the axles, and guiding means associating the end portions of the springs with respective axles for free relative movement between the springs and respective axles, both longitudinally of the frame and vertically, whereby such bodily or tilting movement of the axles in defined paths will impose substantially no end thrust nor positive twisting strain on the springs.

7. In a road vehicle, a frame, a plurality of load carrying axles located near one end of the frame including a main driving axle, an auxiliary dead axle and wheels for said axles, longitudinally extending springs arranged on the main frame, including spring members, the free ends of which operatively engage the dead axle to transfer part of the load on the frame to the dead axle, perch devices on the dead axle having spring rest surfaces and vertical spring guide portions in embracing relation to the free ends of said springs for limiting the axial movement of the dead axle while permitting movement of portions of the springs off respective said spring rest surfaces, means rigidly connecting the side guide portions of the perch devices above the springs opposite the spring rest surfaces of the perches, and means to pivotally secure the dead axle to the frame in such manner that the dead axle may tilt transversely of the frame and be bodily raised and lowered against the action of the springs while the springs move freely longitudinally on the perches or tilt thereon freely transversely of the vehicle.

8. In a road vehicle, a frame including longitudinal frame members and a cross frame member, a pair of axles, wheels associated with said axles, and brakes associated with the wheels of one of the axles, means to connect the axle having said brakes to the frame for pivotal movement about said cross frame member, control means for the brakes, said control means including a yoke embracing the cross frame member and adapted to pivot about the axis thereof, and a shoe interposed between the cross frame member and the yoke, there being means arranged to act on the shoe to draw the yoke away from the cross frame member to apply the brakes.

In testimony whereof, we hereunto affix our signatures.

CHARLES E. F. AHLM.
GEORGE L. ELMSLIE.